(12) United States Patent
Vashchenko et al.

(10) Patent No.: US 8,559,144 B2
(45) Date of Patent: Oct. 15, 2013

(54) ESD CLAMP WITH AUTO BIASING UNDER HIGH INJECTION CONDITIONS

(75) Inventors: Vladislav Vashchenko, Palo Alto, CA (US); Konstantin G. Korablev, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 438 days.

(21) Appl. No.: 12/930,578

(22) Filed: Jan. 10, 2011

(65) Prior Publication Data

US 2012/0176707 A1 Jul. 12, 2012

(51) Int. Cl.
*H02H 9/00* (2006.01)

(52) U.S. Cl.
USPC .......................................................... 361/56

(58) Field of Classification Search
USPC ........................................................... 361/56
See application file for complete search history.

(56) References Cited

U.S. PATENT DOCUMENTS

| 6,501,632 B1* | 12/2002 | Avery et al. ................... 361/111 |
| 6,747,857 B1* | 6/2004 | Lee et al. ......................... 361/56 |
| 2010/0006890 A1* | 1/2010 | Wijmeersch ................... 257/140 |

\* cited by examiner

*Primary Examiner* — Rexford Barnie
*Assistant Examiner* — Joseph Inge
(74) *Attorney, Agent, or Firm* — Eugene C. Conser; W. James Brady; Frederick J. Telecky, Jr.

(57) ABSTRACT

In an SCR ESD protection circuit, the n-type emitter of the SCR is controlled to receive electron current only during an ESD event, thereby defining PNP characteristics during normal operation and SCR characteristics during an ESD event.

6 Claims, 2 Drawing Sheets

ESD CLAMP WITH AUTO BIASING UNDER HIGH INJECTION CONDITIONS

FIELD OF THE INVENTION

The invention relates to Electrostatic Discharge (ESD) devices. In particular it relates to an ESD solution for narrow ESD protection window applications such as high output power arrays.

BACKGROUND OF THE INVENTION

Electrostatic Discharge (ESD) protection becomes challenging when the ESD protection window is very narrow. For instance in protecting the power train of a magnetic DC-DC converter, especially when hot plug-in specification is taken into account, the ESD protection is very narrow due to the high output power array associated with the converter. Ideally therefore the I-V characteristics of the ESD protection device should be substantially vertical. One type of device commonly used for ESD protection is a lateral PNP bipolar junction transistor (BJT), an example of which is shown in FIG. 1 FIG. 1 shows a prior art lateral PNP in cross-section. It includes a p-type emitter 100, a p-type base 102 formed underneath the p-type emitter 100 and extending laterally toward a p-type collector 104. The emitter 100 includes an emitter contact region 110, and the collector includes a collector contact region 114. The contact to the base, which is to the left of the emitter contact, is not shown in FIG. 1. The lateral PNP has the advantage that it provides high holding voltages and typically can handle relatively high currents. However, at values above those corresponding to the holding voltage, the current flowing through the device tends to saturate (typically in the milliamp range). In order increase the protection window and allow the PNP to operate at higher currents requires the size of the device to be increased, resulting in a large footprint.

One ESD protection solution with high current carrying capability is offered by SCR devices, which due to double injection of current can handle higher currents than PNP BJTs (approximately 10 mA/um compared to approximately 1 mA/um for PNPs). A cross section through a prior art SCR is shown in FIG. 2. Like the lateral PNP of FIG. 1, the SCR in FIG. 2 includes a p-type emitter 200 with emitter contact 210, an n-type base 202, which extends underneath the emitter 200 and continues laterally toward a p-type collector 204 with its collector contact 214. As shown in FIG. 2, the emitter contact 210 is connected to the base contact 212 in this case. However, the SCR structure differs from a lateral PNP in that it further includes an n-type region 206 (referred to herein as an n-emitter) with contact 216 on the low voltage side to define a pnpn structure with the emitter 200, base 202, and collector 204. This gives the SCR its double injection characteristics. However SCRs also have a down side caused by the double injection. They have a lower holding voltage than PNPs.

The present invention provides a new ESD protection structure that offers the high holding characteristics of a PNP device as well as the higher current handling capacity provided by an SCR.

SUMMARY OF THE INVENTION

According to the invention there is provided an ESD protection circuit, comprising a PNP structure with a p-type emitter defining an anode, a p-type collector defining a cathode, an n-type base defining a control gate, the ESD protection circuit further comprising an n-type emitter on the cathode side of the control gate, and an auto-biasing circuit connected to the n-type emitter for controlling electron flow into the n-type emitter. The auto-biasing circuit may comprise an NMOS transistor. The NMOS transistor may be controlled by a reference Zener diode connected to a gate of the NMOS transistor. The Zener may be connected between a high voltage node, e.g. a pad, and the NMOS gate. The auto-biasing circuit may include a resistor connected between the gate and ground.

Further, according to the invention, there is provided a method of selectively increasing the current carrying capacity of an ESD device implemented as a PNP transistor that includes a p-type emitter, an n-type base, and a p-type collector, the method comprising providing an n-type emitter on the collector side of the base, and injecting electrons into the n-type emitter only during an ESD event. The injecting of electron current may comprise connecting a transistor between the n-type emitter and ground and controlling the transistor to conduct current only during an ESD event. The transistor may be controlled to conduct current during only part of the ESD event. The transistor may include a control gate, and controlling the transistor may comprise controlling the voltage on the control gate. Controlling the voltage may comprise connecting a Zener diode between the control gate and a protected node. The transistor may comprise an NMOS transistor.

DETAILED DESCRIPTION OF THE INVENTION

Figure 1:
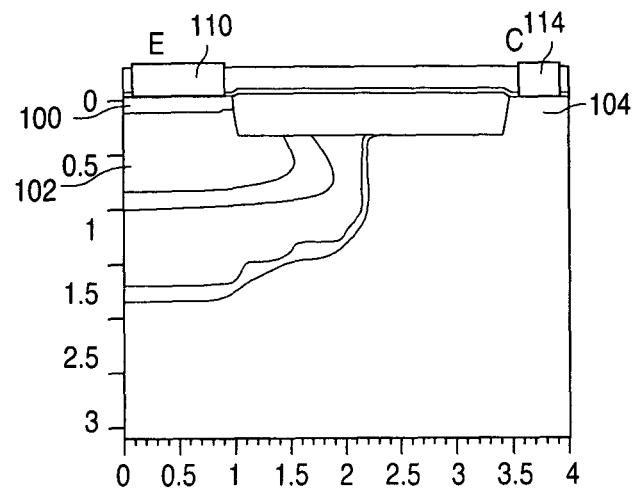
FIG. 1 is a cross-section through a prior art PNP BJT.

The present invention defines an ESD protection circuit that provides for the characteristics of a PNP BJT (such as that illustrated in FIG. 1) when there is no ESD event, but that includes an n-type emitter region on the low voltage side to define an SCR structure. The ESD protection circuit differs from a conventional SCR in that it provides the ability to selectively engage the features and characteristics of an SCR by including an auto-biasing circuit for selectively engaging the n-type emitter region.

Figure 3:
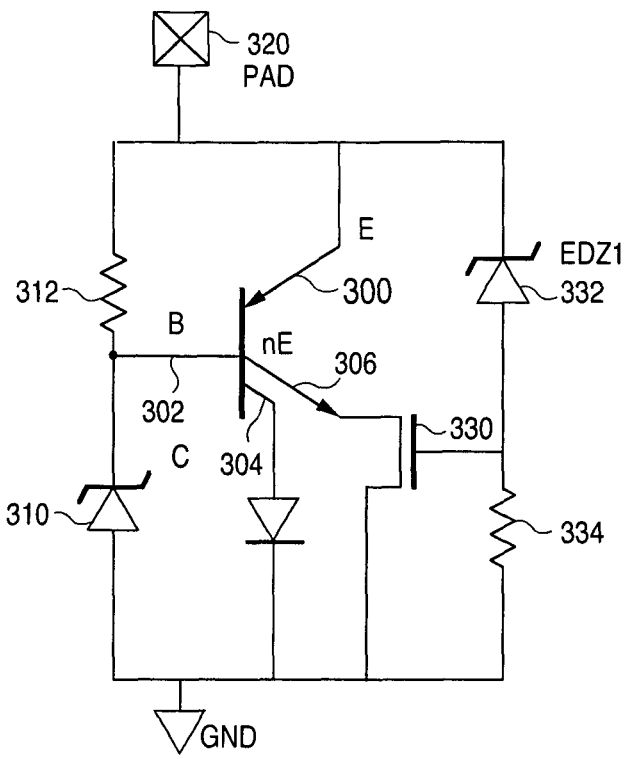
FIG. 3 a circuit diagram of one embodiment of an ESD protection device of the invention controlled by a MOSFET with reference Zener.

As discussed in the implementation of FIG. 3, a resistor may be provided between the emitter and base contacts. One embodiment of an ESD protection circuit of the invention is shown in FIG. 3. The SCR structure includes a PNP device comprising an emitter 300, a base 302 and a collector 304. In addition, to provide the pnpn configuration for an SCR, the structure includes an n-type region in the form of a low side n-emitter, which is depicted by the additional contact 306. In this embodiment, the base 302 of the ESD protection structure is controlled by a low voltage reference Zener 310. The base 302 is thus connected through a resistor 312 to pad 320, and via the Zener 310 to ground. In accordance with the invention, an auto-biasing circuit is provided to control current flow to the n-emitter 306. In this embodiment the auto-biasing circuit comprises an NMOS 330 controlled by a reference Zener diode 332, which connects the gate of the NMOS 330 to the pad 320. The gate of the NMOS is also connected via a resistor 334 to ground to establish a current path to ground.

When the pad voltage is lower than the breakdown voltage of the Zener diode 332 the gate voltage of the NMOS 330 is close to zero since it is tied to ground via the resistor 334. Thus the NMOS 330 is not conducting and the n-emitter contact 306, which is connected to the drain of the NMOS, is floating. Thus the device behaves like a PNP BJT with a correspondingly high holding voltage.

Figure 2:
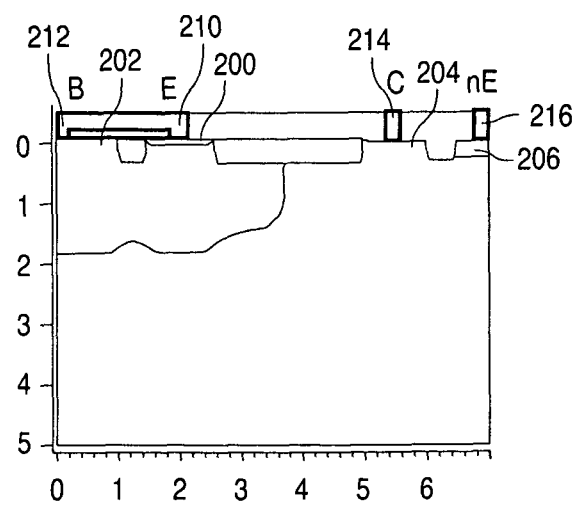
FIG. 2 is a cross-section through a prior art SCR device.
Figure 4:
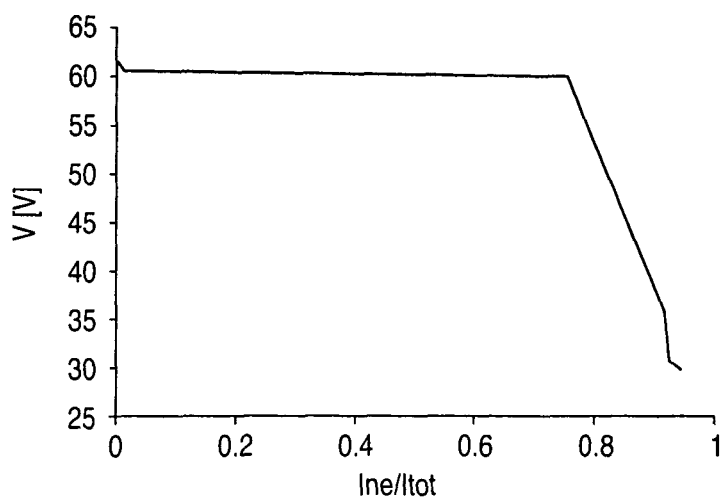
FIG. 4 shows a graph of pad voltage vs In-emitter/Itotal based on simulation results for an ESD protection device of the invention.

Once the pad voltage exceeds the breakdown voltage of the Zener diode 332 the NMOS starts conducting and the channel current provides an electrical connection for the n-emitter 306. This creates the condition for additional electron current and thus injects additional electrons into the conductivity modulation region of the SCR structure as define by the pnpn regions formed by the p-emitter, n-base, p-collector and n-emitter, as discussed above with respect to FIG. 2. It will however be appreciated that at this stage the additional electrons injected into the device also provide for additional space charge compensation resulting in lower holding voltage. On the other hand the on-state resistance of the ESD protection structure is greatly improved to where it is substantially zero. This corresponds to an ideal vertical I-V characteristic. Simulations have demonstrated that as the fraction of the ESD protection structure current flowing through the n-emitter increases the pad voltage (which corresponds to the total current level of 10 mA/um) decreases drastically at about 0.75 as shown in FIG. 4.

The holding voltage can be engineered to the desired value by selecting a Zener diode 332 with the desired properties since the effective clamp voltage (Vhclamp) is related to the PNP transistor holding voltage (Vhpnp) and the breakdown voltage of Zener 332 (Vbredzl) by the relationship Vhclamp=min(Vhpnp,Vbredzl)

The present ESD protection structure therefore provides a new solution for power train protection.

While a particular configuration for the auto-biasing circuit was discussed above with respect to the embodiment of FIG. 3, it will be appreciated that the invention is not limited to the particular auto-biasing circuit. Current into the n-emitter can be controlled in different ways to coincide with an ESD event. For example instead of using an NMOS transistors to control the n-emitter of the SCR, a bipolar junction transistor (BJT), e.g. NPN or PNP can be used to control electron current to the n-emitter.

What is claimed is:

1. An ESD protection circuit, comprising:
   a PNP structure with a p-type emitter defining an anode, a p-type collector defining a cathode, and an n-type base defining a control gate, wherein the p-type emitter of the PNP structure is coupled to a high voltage node, the ESD protection circuit further comprising,
   an n-type emitter on the cathode side of the control gate, and an auto-biasing circuit connected to the n-type emitter for controlling electron flow into the n-type emitter,
   wherein the auto-biasing circuit comprises an NMOS transistor, a first reference Zener diode and a first resistor,
   wherein the NMOS transistor is controlled by the first reference Zener diode connected between a gate of the NMOS transistor and the high voltage node,
   wherein the first resistor is coupled between the gate of the NMOS transitor and ground,
   a second resistor coupled between the n-type base of the PNP structure and the high voltage node,
   a low voltage reference Zener diode coupled between the n-type base of the PNP structure and ground, wherein the low voltage reference Zener diode is configured to control the base of the PNP structure, and
   a diode coupled between the p-type collector of the PNP structure and ground,
   wherein the ESD protection circuit if configured to conduct current through the PNP structure when the voltage on the high voltage node is lower than the breakdown voltage of the first reference Zener diode and starts conducting current through the n-type emitter when the voltage on the high voltage node exceeds the breakdown voltage of the first reference Zener diode thus selectively increasing the current carrying capacity of an ESD device.

2. A method of selectively increasing the current carrying capacity of an ESD device implemented as a PNP transistor that includes a p-type emitter, an n-type base, and a p-type collector, the method comprising
   providing an n-type emitter on the collector side of the base,
   providing an auto-biasing circuit comprised of an NMOS transistor, a first reference Zener diode and a first resistor,
   providing a biasing circuit for the PNP transistor comprised of a low voltage reference Zener diode and a second resistor,
   providing a diode coupled between the p-type collector of the PNP structure and ground, and
   injecting electrons into the n-type emitter only during an ESD event.

3. The method of claim 2, wherein the injecting of electron current comprises
   connecting the NMOS transistor between the n-type emitter and ground and controlling the NMOS transistor to conduct current only during an ESD event.

4. The method of claim 3, wherein the NMOS transistor is controlled to
   conduct current during only part of the ESD event.

5. The method of claim 4, wherein the NMOS transistor includes a control gate,
   and controlling the NMOS transistor comprises controlling the voltage on the control gate.

6. The method of claim 5, wherein controlling the voltage on the control gate comprises connecting a first reference Zener diode between the control gate and a protected node.

* * * * *